(12) United States Patent
Cameron

(10) Patent No.: US 9,063,350 B1
(45) Date of Patent: Jun. 23, 2015

(54) COLORED CONTACT LENS

(76) Inventor: Robert Cameron, Glenview, IL (US)

(*) Notice: Subject to any disclaimer, the term of this patent is extended or adjusted under 35 U.S.C. 154(b) by 0 days.

(21) Appl. No.: 13/468,476

(22) Filed: May 10, 2012

Related U.S. Application Data

(63) Continuation-in-part of application No. 13/406,623, filed on Feb. 28, 2012, now abandoned.

(51) Int. Cl.
*G02C 7/00* (2006.01)
*G02C 7/04* (2006.01)

(52) U.S. Cl.
CPC .......................................... *G02C 7/04* (2013.01)

(58) Field of Classification Search
CPC .......... G02C 7/04; G02C 7/041–7/049; B29D 11/00903; B29D 11/00317; B29D 11/00326
USPC ................ 351/159.02–159.81, 178; 623/6.11–6.62
See application file for complete search history.

(56) References Cited

U.S. PATENT DOCUMENTS

| 4,652,099 | A | * | 3/1987 | Lichtman | ................. | 351/159.24 |
|---|---|---|---|---|---|---|
| 4,840,477 | A | * | 6/1989 | Neefe | ..................... | 351/159.24 |
| 6,123,021 | A | | 9/2000 | Cameron | | |
| 6,288,852 | B1 | | 9/2001 | Cameron | | |
| 6,393,981 | B1 | | 5/2002 | Cameron | | |
| 6,470,797 | B1 | | 10/2002 | Holmberg | | |
| 6,979,419 | B2 | | 12/2005 | Cameron | | |
| 7,651,652 | B1 | | 1/2010 | Cameron | | |
| 7,870,823 | B1 | | 1/2011 | Cameron | | |
| 2003/0054109 | A1 | * | 3/2003 | Quinn et al. | ................ | 427/385.5 |
| 2006/0181676 | A1 | * | 8/2006 | Tucker et al. | .................. | 351/162 |
| 2008/0304009 | A1 | * | 12/2008 | Thomas et al. | ................ | 351/162 |

FOREIGN PATENT DOCUMENTS

JP 08152582 A * 6/1996 ............... G02C 7/04

* cited by examiner

*Primary Examiner* — Ricky Mack
*Assistant Examiner* — Gary O'Neill
(74) *Attorney, Agent, or Firm* — Law Office of John W. Harbst

(57) ABSTRACT

A colored contact lens having a transparent body with a concave surface and a convex surface. A first colored material layered externally on one of the surfaces of the lens. A second colored material is layered externally on the lens and is arranged relative to the first colored layer of material so as to provide an inversion marker when viewed from the concave side of the contact lens whereby enabling the wearer of the contact lens to properly install the lens.

12 Claims, 1 Drawing Sheet

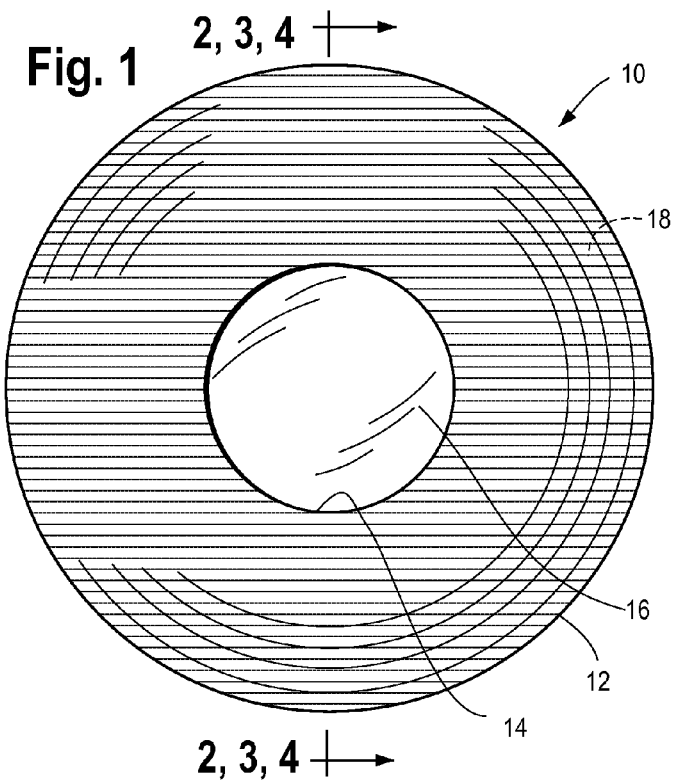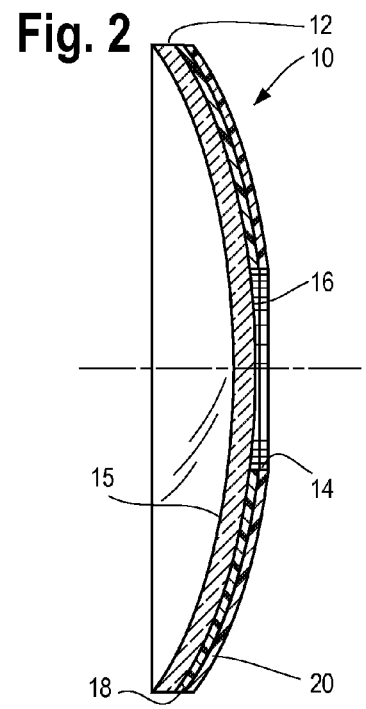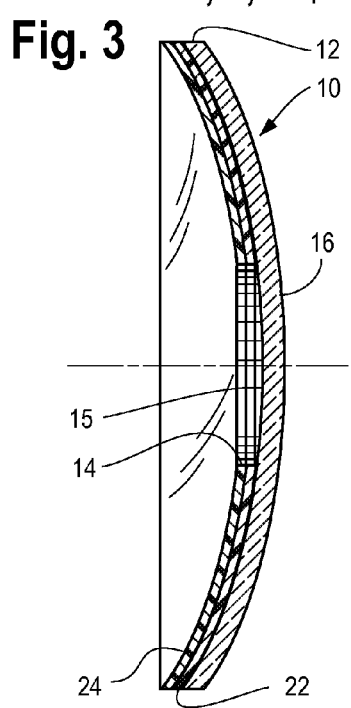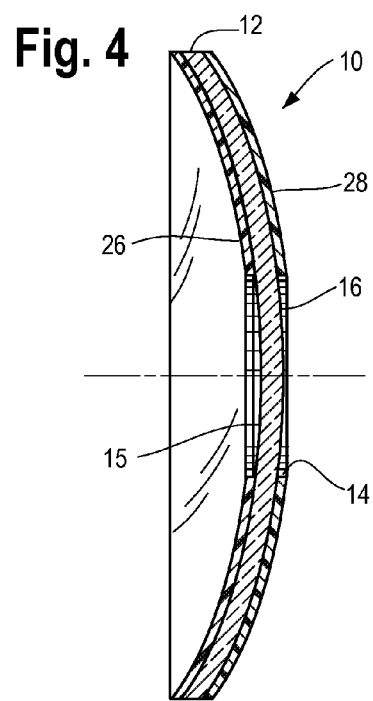

COLORED CONTACT LENS

The present application is a Continuation-in-Part to my co-pending application filed Feb. 28, 2012 and assigned Ser. No. 13/406,623. The present application relates to contact lenses and in particular to lenses having a pattern thereon for altering the color of the iris of the wearer's eye.

BACKGROUND OF THE INVENTION

The primary purpose for a contact lens is to correct the focus of an eye by changing the eye's focal length as needed. It has been found that contact lenses offer a second benefit. By providing a colored pattern on the surface of the contact lens, the coloring of the iris of the eye can be changed. This can be beneficial to an individual who finds eye color to be an important feature of an individual's face and believes that a change in eye color would enhance his or her appearance.

Presently, colored contact lenses have a color pattern around the outer circumference of the contact lens with the color pattern including numerous radially oriented multicolored lines, with the pattern of lines duplicating the pattern normally found in the iris of an eye. The central portion of the contact lens which is positioned over the pupil is left uncolored so as not to obstruct the view of a wearer.

It has been found that it is difficult to reproduce the coloring of the human eye and as a result another individual can often detect when one is wearing a colored contact lens. It is therefore desirable to enhance the coloring qualities of the ink applied to colored contact lenses.

A particular problem for the wearer of contact lenses is that it is difficult to tell the convex side from the concave side of the lens. As a result, the wearer can inadvertently apply the lens to the eye in the upside down orientation thereby causing irritation to the eye and complicating the installation process. To minimize the occurrence of reversing the lens, it has become common to provide inversion markings on one side of the lens that would distinguish the convex from the concave side of the lens. Such inversion markers are normally small in size. Where the uncorrected eyesight of the wearer of the contact lens is poor, it may be difficult for him or her to see a small inversion marker on the contact lens. In such cases, the marker is of no value. It would be desirable, therefore, to provide a more readily visible inversion marker.

SUMMARY OF THE INVENTION

Briefly, the present invention is a colored contact lens that includes a transparent lens body having a concave surface and a convex surface. A white coating is applied to one of the concave surface and convex surface, covering the entire lens except for the central optical zone that is positioned over the pupil of the eye. A colored surface is applied to the transparent lens body with the white coating appearing to be behind the colored coating when the lens is viewed from the convex side.

Accordingly, when viewing the lens from the convex side, one will see the colored coating applied over the white coating, and one viewing the lens from the concave side will see the white coating. Accordingly, the white coating serves as an inversion marker. Also, when such a lens is applied to the surface of the eye, the white coating is positioned between the natural coloring of the eye and the colored coating of the lens. The white coating blocks out the natural color of the iris and provides a background for the colored coating thereby providing a more natural coloring for the eye.

BRIEF DESCRIPTION OF THE DRAWINGS

A better understanding of the invention will be had after a reading of the following detailed description taken in conjunction with the drawings wherein:

FIG. 1 is a front elevational view of a colored contact lens in accordance with the present invention;

FIG. 2 is a cross-sectional view of the contact lens shown in FIG. 1 taken through line 2-2 thereof;

FIG. 3 is a second cross-sectional view of the lens taken through line 2-2 thereof.

FIG. 4 is a third cross-section of the lens taken through line 2-2 thereof.

DETAILED DESCRIPTION OF PREFERRED EMBODIMENT

Referring to FIGS. 1 and 2, a contact lens 10 has a transparent body with a circular outer edge 12 and includes a transparent central portion 14, call the optical zone, that is sized and shaped for fitting over the pupil of the eye of a wearer. The lens 10 further has a convex surface 16 and a concave surface 15 of which the concave surface 15 is suitable for contacting the eye of a wearer and the convex surface 16 is visible to others who encounter the wearer.

To change the color of the eye of a wearer the lens 10, a pattern of color is applied to the annular portions of one of the surfaces 15, 16 that surround the optical zone 14. The colored portion therefore covers the iris of the eye of the wearer thereby changing the color of the iris as viewed by another.

In accordance with one embodiment of the present invention disclosure, a white coating is applied to the lens on either the concave surface 15 or convex surface 16 and is spread across a broad area extending from the outer edge 12 to the optical zone 14. In one form, the white coating is opaque and extends continuously, without interruptions or changes in density or intensity from the outer edge to the optical zone 14. Where the coating is applied using an ink process, it may be desirable to apply three or more layers of white coating to achieve the coverage needed to block out the natural coloring of the iris of the eye of the wearer.

Referring to FIG. 2, when the white coating 18 is applied to the convex surface 16, the pattern of coloring 20 that changes the color of the wearer's eye is applied over the white coating 18 so that the white coating is underneath the colored coating 20. The white coating 18 serves as a background for the colored coating 20.

It should be appreciated that in order for a colored contact lens to reproduce the coloring of the human eye, the lens must present a pattern of radial lines of various colors, and these colors must be applied to the convex surface by some sort of printing process. It is presently the practice to use a four color printing process, where the four colors include yellow, magenta (or red), cyan (blue), and black to provide all the colorings normally needed in a printing process to duplicate the pattern of a human iris. However, where these four colors are applied to a transparent lens body 10 that has not been provided with a white coating 18 in accordance with the present invention, the underlying multicolored pattern of the wearer's iris becomes the background for the colorings printed on the surface of the lens 10. The natural colorings of the iris will therefore distort the printed colorings of prior art contact lenses.

Referring to FIG. 3, the color can also be applied to the concave surface 15 of the lens. In this case, the four color printing 22 (or other means for applying color) is applied to the concave surface first. After the color coating 22 has dried, a white coating 24 is applied over the color coating 22. Again, when viewed from the convex side, the color coating 22 will appear to have been applied over the white coating 24.

The white coating 18, 24 of the present invention provides a white background above which is the color coating 20, 22. The importance of the white coating can be appreciated when if one considers that four color printing normally occurs on a white surface such as white paper or linen. The white background therefore becomes a factor in creating the colorings of the finished product. In like manner, the white coating 18 that is applied to the transparent convex surface 16 or applied over the color coating 22 of a concave surface provides the white background needed to achieve true colorings in a four color printing process.

Referring to FIG. 4, coloring could also be applied to both surfaces 15, 16 of the lens 10. In this embodiment, a white coating 26 is applied to the concave surface 15 and a colored coating 28 is applied to the convex surface 16.

A consequential benefit of the provision of the white coating 18, 24, 26 is that the white coating 18, 24, 26 is clearly visible from the concave side 15 of the lens 10 and is not clearly visible from the convex side 16 because the color coating 20, 22, 28 is visible from the convex side. Accordingly, the white coating 18, 24, 26 visible from the concave side becomes an easily identified inversion marker enabling the wearer of a contact lens to properly install the lens without error.

While the present invention has been described with respect to two embodiments, it will be appreciated that many modifications and variations can be made without departing from the spirit and scope of the invention. It is therefore the intent of the following claims to cover all such modifications and variations that fall within the spirit and scope of the invention.

What is claimed is:

1. A colored contact lens comprising:
    a transparent lens body having a concave surface and a convex surface;
    a colored material layered externally on one of said concave surface and said convex surface of said lens and arranged on said contact lens such that when said contact lens is viewed from said convex side said colored material layer is observed, with said colored layer of material extending from an outer edge of said lens to an optical zone thereof;
    a white or non-white opaque material layered externally on said lens and arranged relative to said colored layer of material layer such that when said contact lens is viewed from the concave side of the lens the white or non-white opaque material layer is observed whereby providing an inversion marker for said contact lens thereby facilitating the wearer of said contact lens to properly install said lens, with said inversion marker extending continuously without interruptions, changes in density or intensity from the outer edge of said lens to the optical zone thereof.

2. The contact lens of claim 1, wherein said colored material is externally layered on said convex surface of said lens and said white or non-white opaque material is externally layered over said colored material.

3. The contact lens of claim 1, wherein said white or non-white opaque material is externally layered on said convex surface of said lens and said colored material is layered over said white or non-white opaque material on said convex surface of said lens.

4. The contact lens of claim 1, wherein said white or non-white opaque material is externally layered on said concave surface of the lens, and said colored material is externally layered on said convex surface of said lens.

5. The colored contact lens of claim 1, wherein said colored layer of material has sufficient density to block out the coloring of the iris of the wearer's eye.

6. The colored contact lens of claim 1, wherein said colored material layered externally on one of said concave surface and said convex surface of said leans and extending from the outer edge of said lens to the optical zone thereof has a constant thickness.

7. The colored contact lens of claim 1, wherein said white or non-white opaque material layered externally on said leans and extending from the outer edge of said lens to the optical zone thereof has a constant thickness.

8. A method of producing a colored contact lens, comprising the steps of:
    appending a layer of colored material externally to one of a concave surface and a convex surface of a transparent contact lens and arranged on said contact lens such that when said contact lens is viewed from the convex side said colored layer is observed, with said layer of colored material extending from an outer edge of said lens to an optical zone thereof;
    appending a white or non-white opaque material externally to said lens, with said white or non-white opaque layer of material being arranged relative to said layer of colored material such that when said contact lens is viewed from the concave side of the lens the white or non-white opaque material layer is observed whereby providing an inversion marker for said contact lens thereby facilitating the wearer of said contact lens to properly install said lens, with said inversion marker extending continuously without interruptions, changes in density or intensity from the outer edge of said lens to the optical zone thereof.

9. The method of producing a contact lens according to claim 8, wherein said layer of colored material is externally appended to said concave surface of said lens and said white or non-white opaque layer of material is externally appended over said colored material.

10. The method of producing a contact lens according to claim 8, wherein said white or non-white opaque layer of material is externally appended to said convex surface of said lens and said colored material is layered over said white or non-white opaque layer of material.

11. The method of producing a contact lens according to claim 8, wherein said layer of colored material is externally appended to said convex surface of the lens, and said white or non-white opaque material is externally appended to said concave surface of said lens.

12. The method of producing a contact lens according to claim 8, wherein said layer of colored material has sufficient density to block out the coloring of the iris of the wearer's eye.

* * * * *